United States Patent
Sharma et al.

(10) Patent No.: US 12,141,724 B2
(45) Date of Patent: Nov. 12, 2024

(54) SYSTEMS AND METHODS FOR IMPLEMENTING OUT-OF-OFFICE STATUS

(71) Applicant: Avaya Management L.P., Durham, NC (US)

(72) Inventors: Tanvi Sharma, Pune (IN); Pragati Dhumal, Pune (IN); Navanath Navaskar, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/470,845

(22) Filed: Sep. 9, 2021

(65) Prior Publication Data

US 2023/0073610 A1 Mar. 9, 2023

(51) Int. Cl.
  *G06Q 10/00* (2023.01)
  *G06Q 10/0631* (2023.01)
  *G06Q 10/107* (2023.01)
  *H04L 51/02* (2022.01)

(52) U.S. Cl.
  CPC ... *G06Q 10/063114* (2013.01); *G06Q 10/107* (2013.01); *H04L 51/02* (2013.01)

(58) Field of Classification Search
  None
  See application file for complete search history.

(56) References Cited

U.S. PATENT DOCUMENTS

| | | | |
|---|---|---|---|
| 8,661,142 B2 | 2/2014 | Scott et al. | |
| 2008/0195512 A1* | 8/2008 | Klebanoff | G06Q 40/125 705/32 |
| 2011/0047220 A1* | 2/2011 | Lee | G06Q 10/107 709/206 |
| 2013/0073662 A1* | 3/2013 | Meunier | G06F 15/16 709/206 |
| 2018/0131647 A1* | 5/2018 | Nagesha | H04L 51/214 |
| 2020/0342414 A1* | 10/2020 | Smith | G06Q 30/018 |
| 2020/0402007 A1* | 12/2020 | Ramesh | G06Q 10/107 |
| 2021/0243147 A1* | 8/2021 | Patrick | G06F 21/31 |
| 2022/0309412 A1* | 9/2022 | Tomaselli | G06Q 10/0631 |
| 2023/0012316 A1* | 1/2023 | Mavinakuli | G06N 3/0895 |

OTHER PUBLICATIONS

How to turn off "Out of Office" by Paul McKenna Jun. 2, 2020 https://itfoundations.com/how-to-turn-off-out-of-office/ (Year: 2020).*
Cognitive Email Autoresponder, An IP.com Prior Art Database Technical Disclosure Authors et. al.: Disclosed Without Attribution, Dec. 3, 2018 (Year: 2018).*

* cited by examiner

*Primary Examiner* — Matheus Ribeiro Stivaletti
(74) *Attorney, Agent, or Firm* — Sheridan Ross P.C.

(57) ABSTRACT

Systems and methods of automatically generating out-of-office statuses, automatic responses to emails, and voicemail messages for users. Disclosed systems and methods include detecting a first user is out-of-office, determining a second user associated with the first user, generating a request for out-of-office approval, sending the request for out-of-office approval to the second user, receiving an approval from the second user, and generating an out-of-office message for the first user.

20 Claims, 11 Drawing Sheets

| Calendar | | | | | | |
|---|---|---|---|---|---|---|
| | New Event | | | Schedule Out of Office | | X |
| SUN 17 | MON 18 | TUE 19 | WED 20 | THU 21 | FRI 22 | SAT 23 |

OUT OF OFFICE

- 11 AM: Call with Jane
- 12 PM: Lunch with Francis
- 12 PM–2 PM: Study with Miguel
- 12 PM–1 PM: Swim at pool
- 1 PM–3 PM: Finance meeting

FIG. 3F

SYSTEMS AND METHODS FOR IMPLEMENTING OUT-OF-OFFICE STATUS

FIELD

The disclosure relates generally to electronic calendaring applications and more particularly to automatically generating an out-of-office status for a user.

BACKGROUND

As electronic user devices such as smartphones, tablets, computers, etc., become more commonplace, more and more communication between people occurs electronically. The Internet has enabled real-time spread of information. Using electronic calendar applications, such as Google Calendar™ and Outlook™, users are benefitted with the ability to schedule events for many people with minimal interactions. Calendar items relating to events are created using calendar applications and invitations to such meetings are often sent using email.

Calendaring applications also allow users to create a scheduled out-of-office status. Out-of-office status is often scheduled as a meeting extending the duration of a time for which a user will be away from the office or unable to reply to emails.

These conventional out-of-office statuses, however, create an unrealistic expectation that any user without an out-of-office status should be capable of responding to emails. Such conventional systems may be adequate for pre-planned absences, such as scheduled appointments or vacations. Conventional out-of-office systems are not capable, however, of being enabled except by the user who will be out of the office. As a result, when a user is suddenly and unexpectedly required to be away from the office—such as in an emergency situation—the user must manually set the out-of-office status.

Users who find themselves unexpectedly out-of-office may be unlikely or unable to take the time to set their status as out-of-office. For this reason, conventional out-of-office status systems are inadequate due to a requirement of being manually set by the user.

BRIEF DESCRIPTION OF THE DRAWINGS

FIGS. 3A-3H are illustrations of user interfaces in accordance with one or more embodiments of the present disclosure;

DETAILED DESCRIPTION

Figure 1:
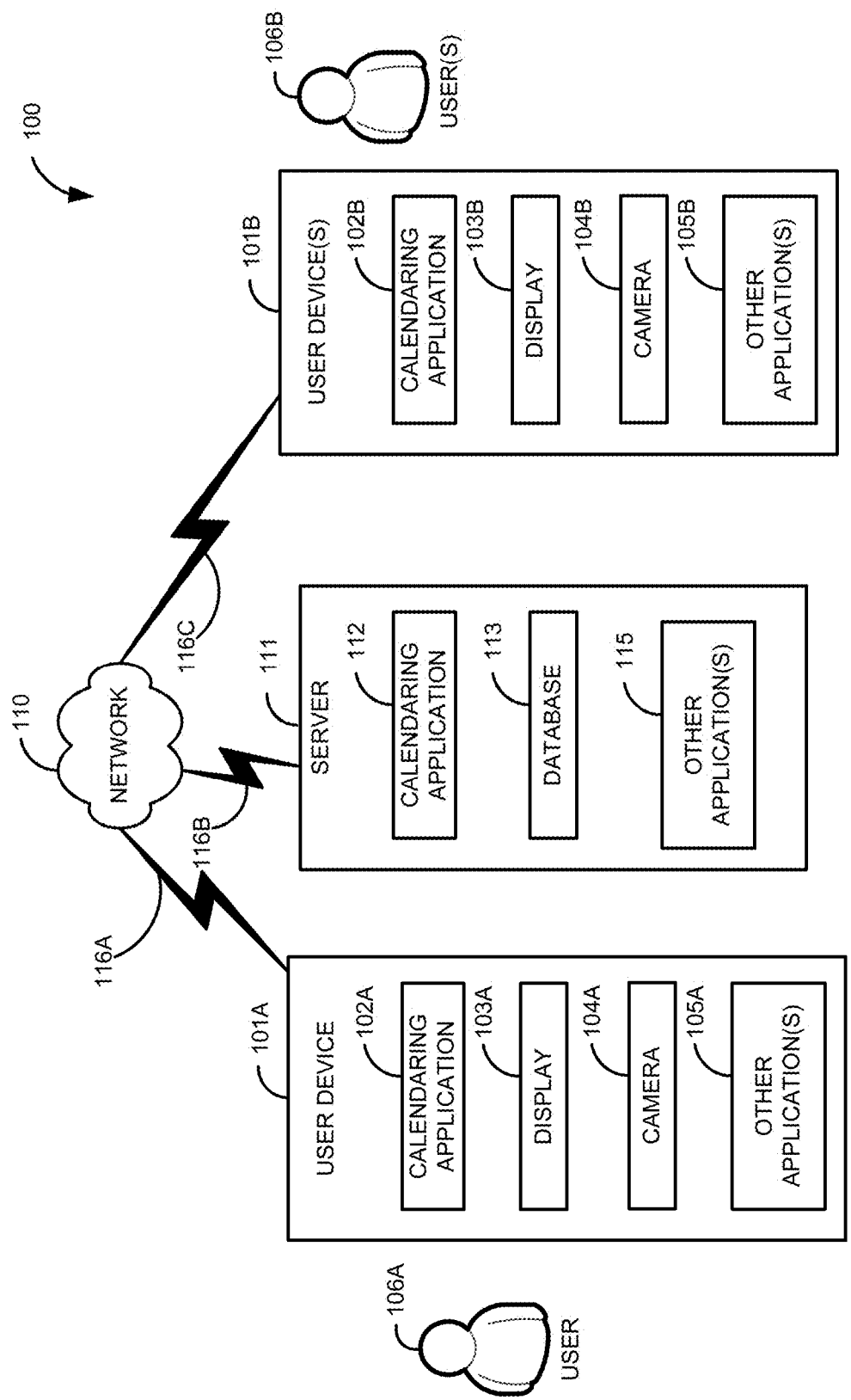
FIG. 1 is a block diagram of a first illustrative system for implementing an electronic calendar application in accordance with one or more embodiments of the present disclosure.

The above-discussed issues with contemporary out-of-office status systems, such as those managed by calendar applications and other needs are addressed by the various embodiments and configurations of the present disclosure. As described herein, a calendaring application may enable users to implement an out-of-office status automatically through the analysis of text and/or audio messages.

Systems and methods as described herein resolve the above-discussed issues by automatically analyzing data, such as text messages, emails, voicemails, etc., determining a user is or will be out-of-office, and either automatically enabling an out-of-office status or providing an option to another user, such as a manager or supervisor, to approve, deny, or edit an out-of-office status for the user. For example, when a user finds him or herself in a situation in which he or she must quickly leave work, the user may email, call, or otherwise contact someone and explain the situation. A system as described herein may be enabled to analyze data created by the user, such as text of the email, audio from the call, etc. The system may be enabled to, based on the analysis of the data, determine an out-of-office status should be created. The system may next alert a supervisor or manager as to the situation and the supervisor or manager may be provided an opportunity to approve, deny, or edit the out-of-office status. For example, the system may generate text of an out-of-office status, such as "Sorry, I am not available," and such text may be displayed to a supervisor or manager for approval. The system may also be enabled to determine or estimate a date and/or time range for which the out-of-office status should be implemented.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a," "an," "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Any combination of one or more computer-readable mediums may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

FIG. 1 is a block diagram of a first illustrative system 100 capable of implementing out-of-office statuses with calendaring applications and sending emails or other forms of communication in accordance with one or more of the embodiments described herein. A first illustrative system 100 comprises user communication devices 101A, 101B and a network 110. In addition, users 106A-106B are also shown.

The user communication devices 101A, 101B can be or may include any user device that can communicate on the network 110, such as a Personal Computer ("PC"), a video phone, a video conferencing system, a cellular telephone, a Personal Digital Assistant ("PDA"), a tablet device, a notebook device, a smartphone, and/or the like. Although only two user communication devices 101A, 101B are shown for convenience in FIG. 1, any number of user communication devices 101 may be connected to the network 110.

The user communication devices 101A, 101B further comprise electronic calendaring applications 102A, 102B, displays 103A, 103B, and cameras 104A, 104B. It should be appreciated that, in some embodiments, user devices may lack cameras 104A, 104B or other components. Also, while not shown for convenience, the user communication devices 101A, 101B may comprise other elements, such as a microprocessor, a microphone, a browser, other applications, and/or the like.

In addition, the user communication devices 101A, 101B may also comprise other application(s) 105A, 105B. The other application(s) 105A can be any application, such as a presentation application, a document editor application, a document display application, a graphical editing application, a calculator, an email application, a spreadsheet, a multimedia application, a gaming application, and/or the like. The communication applications 102A, 102B can be or may include any hardware/software that can execute an electronic calendar application that is displayed to users 106A or 106B. For example, the communication applications 102A, 102B can be used to execute and display an electronic calendar application.

The displays 103A, 103B can be or may include any hardware display or projection system that can display an image of a video conference, such as a LED display, a plasma display, a projector, a liquid crystal display, a cathode ray tube, and/or the like. The displays 103A-103B can be used to display user interfaces as part of communication applications 102A-102B.

The user communication devices 101A, 101B may also comprise one or more other applications 105A, 105B. The other applications 105A, 105B may work with the electronic calendar applications 102A, 102B.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocol, video protocols, Integrated Services Digital Network (ISDN), and the like. Thus, the network 110 is an electronic communication network configured to carry messages via packets and/or circuit switched communications.

The network may be used by the user devices 101A, 101B, and a server 111 to carry out communication such as interactions using the electronic calendar applications. Data 116A may be sent and/or received via user device 101A, data 116B may be sent and/or received via server 111, and data 116C may be sent and/or received via user device 101B.

The server 111 may comprise any type of computer device that can communicate on the network 110, such as a server, a Personal Computer ("PC"), a video phone, a video conferencing system, a cellular telephone, a Personal Digital Assistant ("PDA"), a tablet device, a notebook device, a smartphone, and/or the like. Although only one server 111 is shown for convenience in FIG. 1, any number of servers 111 may be connected to the network 110 for managing electronic calendar application items.

The server 111 may further comprise an electronic calendar application 112, database(s) 113, other application(s)

115, and, while not shown for convenience, other elements such as a microprocessor, a microphone, a browser application, and/or the like. In some embodiments, machine learning and/or natural language processing algorithms may be executed by the server or other devices to carry out the work of processing event data such as transcribing audio from a live event, while in other embodiments, the server or another device may access one or more third party services provided by, for example, one or more cloud service providers for machine learning and/or audio processing for processing data. In some embodiments, a combination of server-executed artificial intelligence systems and third party-based systems may be used.

Figure 2B:
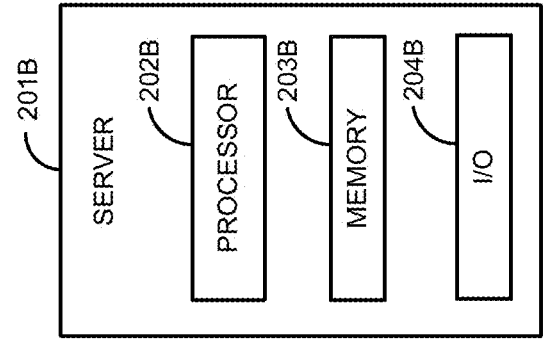
FIG. 2B is a block diagram of a server for executing an electronic calendar application in accordance with one or more embodiments of the present disclosure.
Figure 2A:
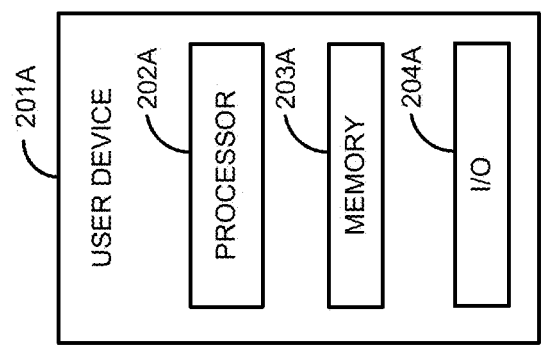
FIG. 2A is a block diagram of a user device system for executing an electronic calendar application in accordance with one or more embodiments of the present disclosure.

FIGS. 2A and 2B illustrate components of an exemplary user device 201A and server 201B for use in certain embodiments as described herein. In some embodiments, a user device 201A may comprise a processor 202A, memory 203A, and input/output devices 204A. Similarly, a server 201B may comprise a processor 202B, memory 203B, and input/output devices 204B.

A processor 202A, 202B may comprise one or more processors and/or microprocessors. As used herein, processor may refer to a plurality of processors and/or microprocessors operating together. Processors 202A, 202B may be capable of executing software and performing steps of methods as described herein. For example, a processor 202A, 202B may be configured to display user interfaces on a display of a computer device. Memory 203A, 203B of a user device 201A, 201B may comprise memory, data storage, or other non-transitory storage device configured with instructions for the operation of the processor 202A, 202B to perform steps described herein. Accordingly, processes may be embodied as machine-readable and -executable code for execution by a processor to perform the steps herein and, optionally, other processing tasks. Input/output devices 204A, 204B may comprise, but should not be considered as limited to, keyboards, mice, microphones, cameras, display devices, network cards, etc.

Illustratively, the user communication devices 101A, 101B, calendar applications, displays, application(s), etc. are stored-program-controlled entities, such as a computer or microprocessor, which perform the methods and the processes described herein by executing program instructions stored in a computer-readable storage medium, such as a memory (i.e., a computer memory, a hard disk, and/or the like). Although the methods described herein may be shown in a specific order, one of skill in the art would recognize that the steps of systems and methods described herein may be implemented in different orders and/or be implemented in a multi-threaded environment. Moreover, various steps may be omitted or added based on implementation.

Figure 3A:
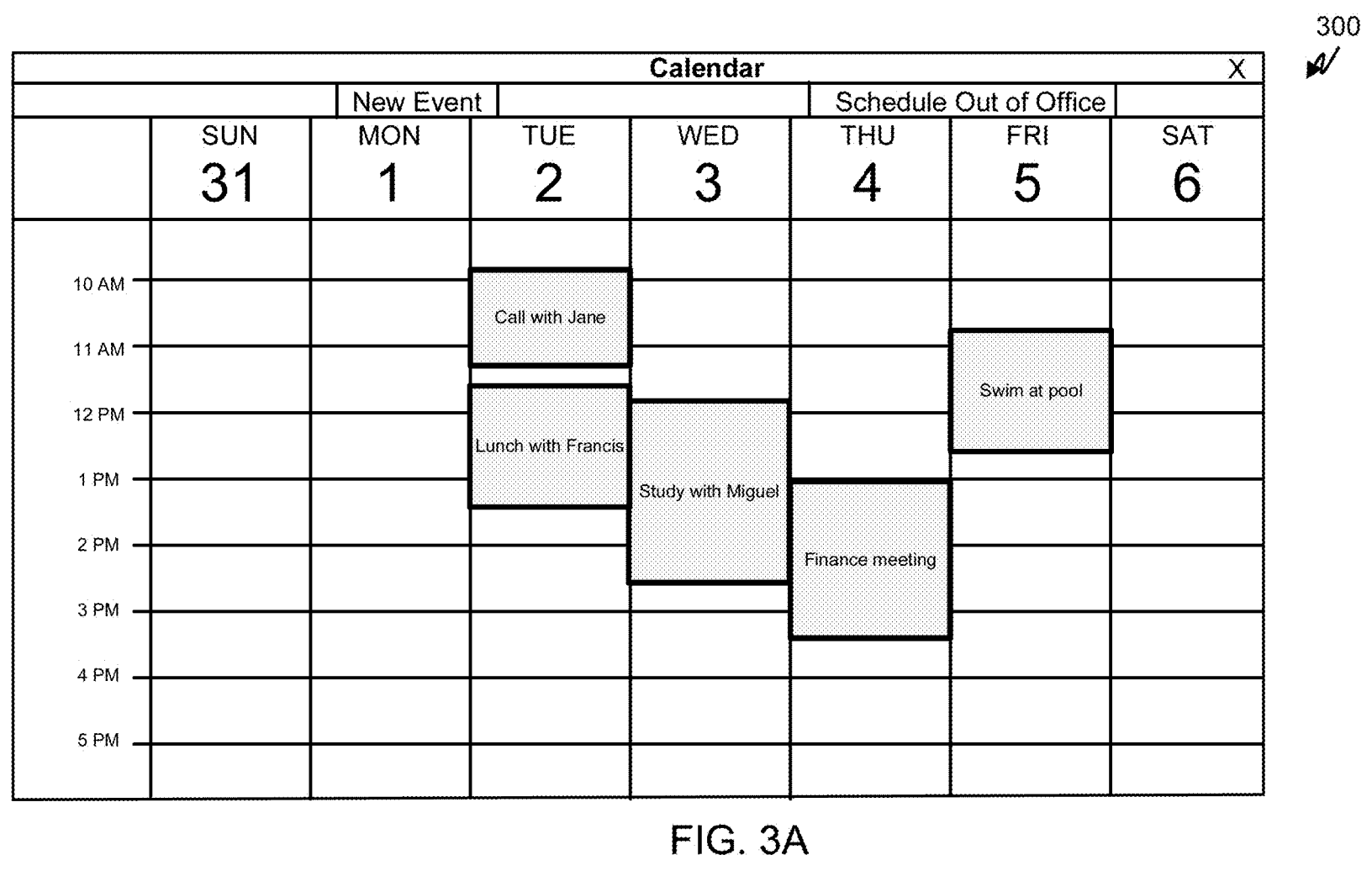

FIG. 3A is an illustration of a user interface 300 for an electronic calendaring application as described herein. The user interface 300 may comprise a view of a calendar. A user interface 300 for an electronic calendaring application may include a daily, weekly, monthly, yearly, or other time-range view. The user interface 300 includes graphical user interface ("GUI") elements enabling a user to create new calendar items or events and to schedule out-of-office periods. The user interface 300 may also include visual indicators of the events or meetings scheduled during the displayed time range. In the example user interface 300 displayed in FIG. 3A, the user has an event "Call with Jane" scheduled on Tuesday, the $2^{nd}$, from around 10 AM to around 11:15 AM; a "Lunch with Francis" event scheduled on Tuesday, the $2^{nd}$, from around 11:45 AM to around 1:30 PM; a "Study with Miguel" event scheduled on Wednesday, the $3^{rd}$, from around 11:45 AM to around 2:30 PM; a "Finance meeting" event scheduled on Thursday, the $4^{th}$, from around 1 PM to around 3:30 PM; and a "Swim at pool" event scheduled on Friday, the $5^{th}$, from around 10:45 AM to around 12:30 PM.

Using an electronic calendar application as described herein, a user may be enabled to initiate an out-of-office time period. For example, a user may be enabled to manually initiate an out-of-office time period by interacting with GUI elements in a user interface such as that illustrated in FIG. 3A. Initiating an out-of-office time period manually may comprise interacting with a GUI element to instruct an electronic calendar application to set an out-of-office status.

Figure 3B:
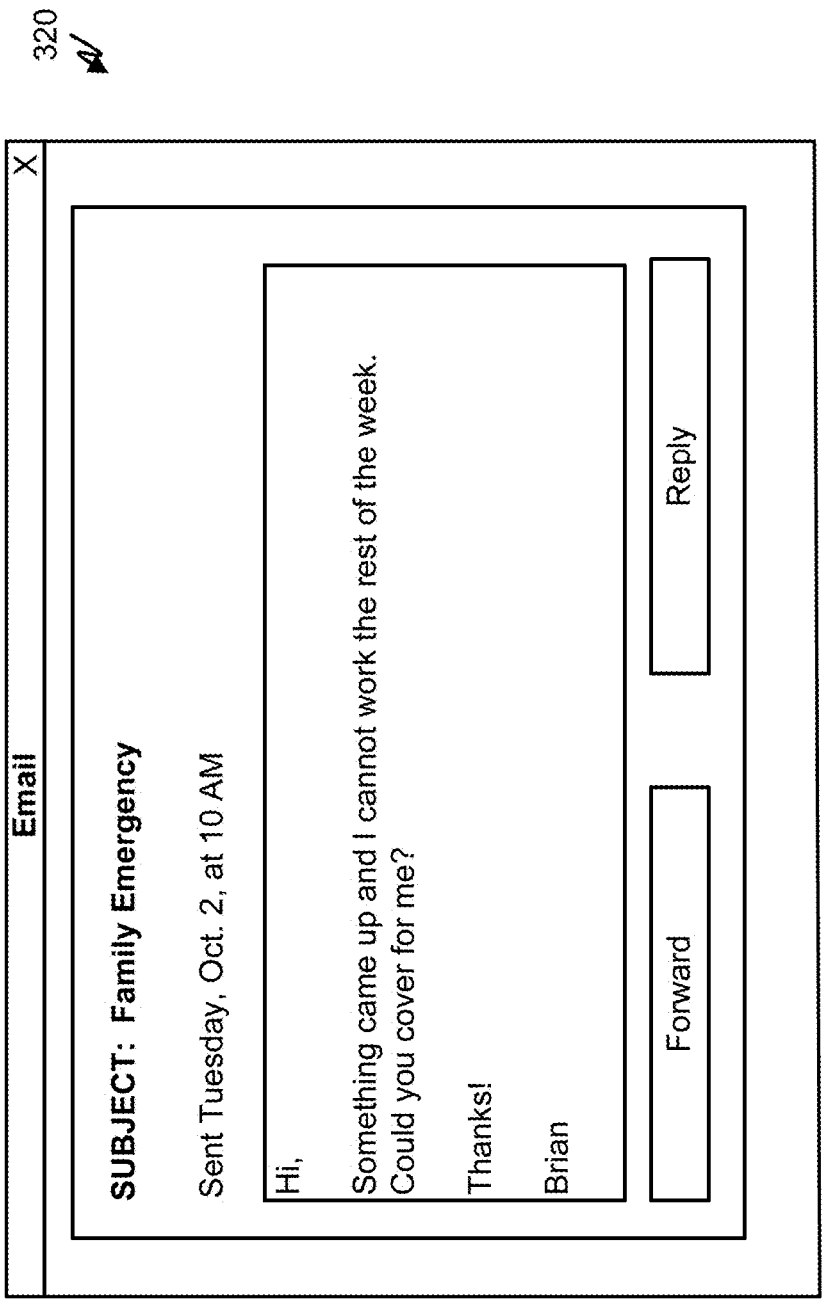

As illustrated in FIG. 3B, data generated by or received from a user may be in the form of an email. As discussed herein, a computer system may be enabled to process text of data generated by or received from a user, such as a subject and/or body of an email, or audio of data generated by or received from a user, such as audio from a live call or a recorded voicemail. In the example email 320 of FIG. 3B, the subject reads, "Family Emergency," and the body reads:

Hi,

Something came up and I cannot work the rest of the week. Could you cover for me?

Thanks!

Brian

As described herein, a computer system may be configured to execute an analysis system, such as a neural network, trained to analyze text or audio created by a user to determine the user is or will be out-of-office. The analysis system may also be trained to determine a period of time for which the user will be out-of-office. For example, analyzing the email 320 of FIG. 3B may result in the analysis system determining the user having sent the email will be out-of-office from the time the email was sent until the end of the week.

As discussed in further detail below, after determining a user is or will be out-of-office, a computer system may be configured to identify a responsible user, such as a manager, supervisor, or other person. The computer system may next generate an alert or notification to be displayed at a computer device associated with the responsible user. In some embodiments, the alert or notification may be in the form of an email.

Figure 3C:
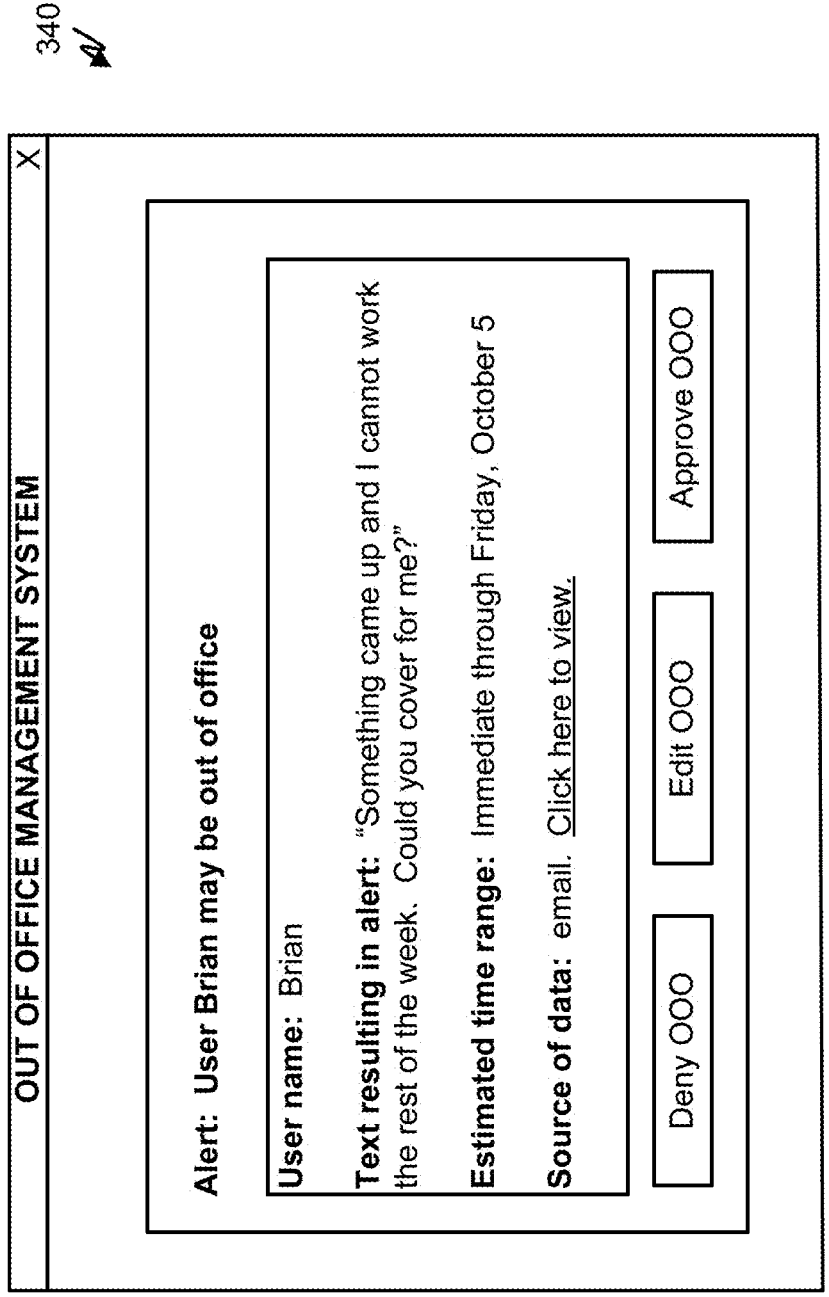

As illustrated in FIG. 3C, an alert or notification may be in the form of a user interface 340 of an out-of-office management system. Such an alert or notification may comprise an alert title. An alert title may be generated by the computer system based on data from the out-of-office user. For example, the alert title may indicate a name of the out-of-office user, a date range determined by the computer system for the out-of-office status, or other information. The information in the alert title may be based on data from the out-of-office user such as text from an email sent by the out-of-office user, audio from a phone call made by the out-of-office user or from a recording of a voicemail created by the out-of-office user.

An alert or notification may also comprise a username or real name of the user who is or will be out-of-office. In some embodiments, the username may be an email address. The username or real name may be determined based on a contact list associated with the responsible user.

An alert or notification may also comprise a display of the text resulting in the alert. For example, if an email sent by the out-of-office user resulted in the generation of the alert or notification to the responsible user, text of the email may be included in the alert or notification. In some embodiments, a portion of the text may be extracted and displayed in the alert or notification. The portion of the text may be chosen automatically by the computer system based on a determination that the portion of the text includes information relevant to the out-of-office status. Similarly, if the out-of-office alert or notification was generated based on audio, an audio file or a link to the audio may be presented in the alert or notification.

An alert or notification may also comprise a display of an estimated time range. As described herein, the estimated time range may be determined automatically based on data created by the out-of-office user. An estimated time range may have a start time and date and an end time and date. In some situations, the start time and date may be immediate and set to a current time. In some situations, the time range may be indefinite, and no end time or date may be set.

An alert or notification may also comprise a n indication as to the source of the data which led to the alert being generated and a link to the data or a copy of the data. For example, if an email resulted in the generation of the alert or notification, the alert or notification may state "email" and include a hyperlink to a location of the email file or a copy of the email file. The responsible user may use the hyperlink to view the email. Similarly, if a voicemail resulted in the alert or notification, an audio file or a link to an audio file of the voicemail may be included.

An alert or notification may also comprise GUI elements enabling the responsible user to deny the out-of-office status, approve the status, or edit factors associated with the status. Editing the factors associated with the status may comprise adjusting a time range, text of an email to be sent as an auto-response for the out-of-office user, recording a voicemail to be played when people call the out-of-office user, or adjusting other factors which may be related to the out-of-office status.

Figure 3D:
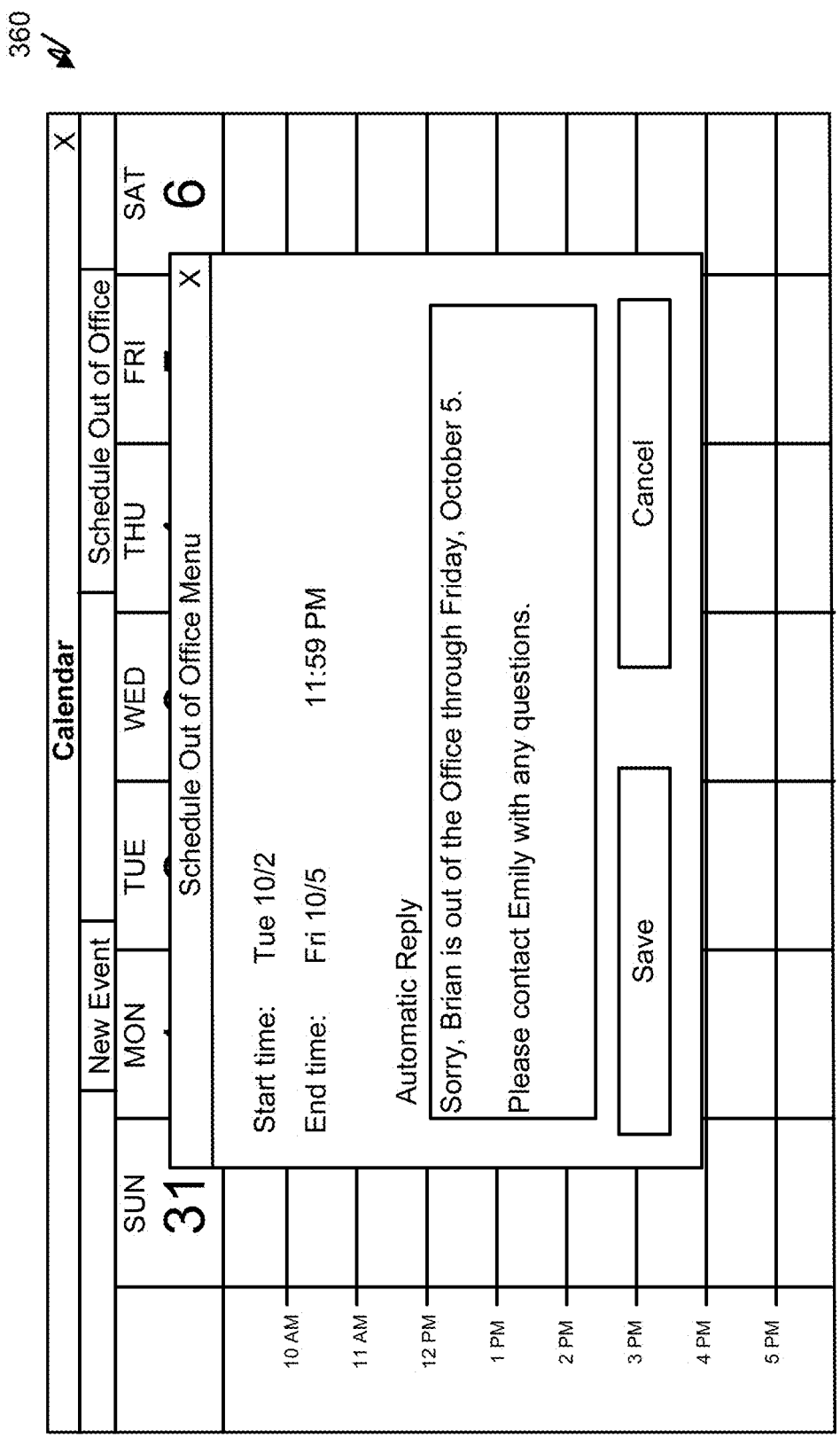

As illustrated in FIG. 3D, an out-of-office scheduling menu may comprise a user interface 360. The user interface 360 of the out-of-office scheduling menu may comprise user-interactable GUI elements such as a text-box or drop-down menu enabling a user to select a start time and date and an end time and date for the out-of-office period. The user interface 360 of the out-of-office scheduling menu may also comprise a user-interactable GUI element such as a text-box or drop-down menu enabling a user to input or select a message for the out-of-office period. The message may be sent in the form of an email as a reply to any emails received during the selected out-of-office time period. A user may be capable of editing existing out-of-office time periods and/or creating new out-of-office time periods.

In the example illustrated in FIG. 3D, the out-of-office status is set to begin on Tuesday, October 2 and last until Friday, October 5, at 11:59 PM. The start and end times may be automatically set by the computing system after analyzing data created by the out-of-office user. The responsible user may be enabled through interacting with the user interface 360 to manually adjust the dates and times for the out-of-office status for the out-of-office user. As illustrated in FIG. 3D, the following text is set as an automatic reply for the out-of-office time period:

Sorry, Brian is out of the Office through Friday, October 5.

Please contact Emily with any questions.

The responsible user may be enabled through interacting with the user interface 360 to manually adjust the text to be displayed for the out-of-office status for the out-of-office user. While the user interface 360 is shown as enabling a user to set and adjust an out-of-office status for an electronic calendaring application, it should be appreciated the same or similar features, systems, and methods may be used to enable a user to adjust a voicemail message for a user. For example, the responsible user may be enabled to record an audio message to be played for the out-of-office user's voicemail during the period of time the out-of-office user is expected to be out-of-office.

Figure 3E:
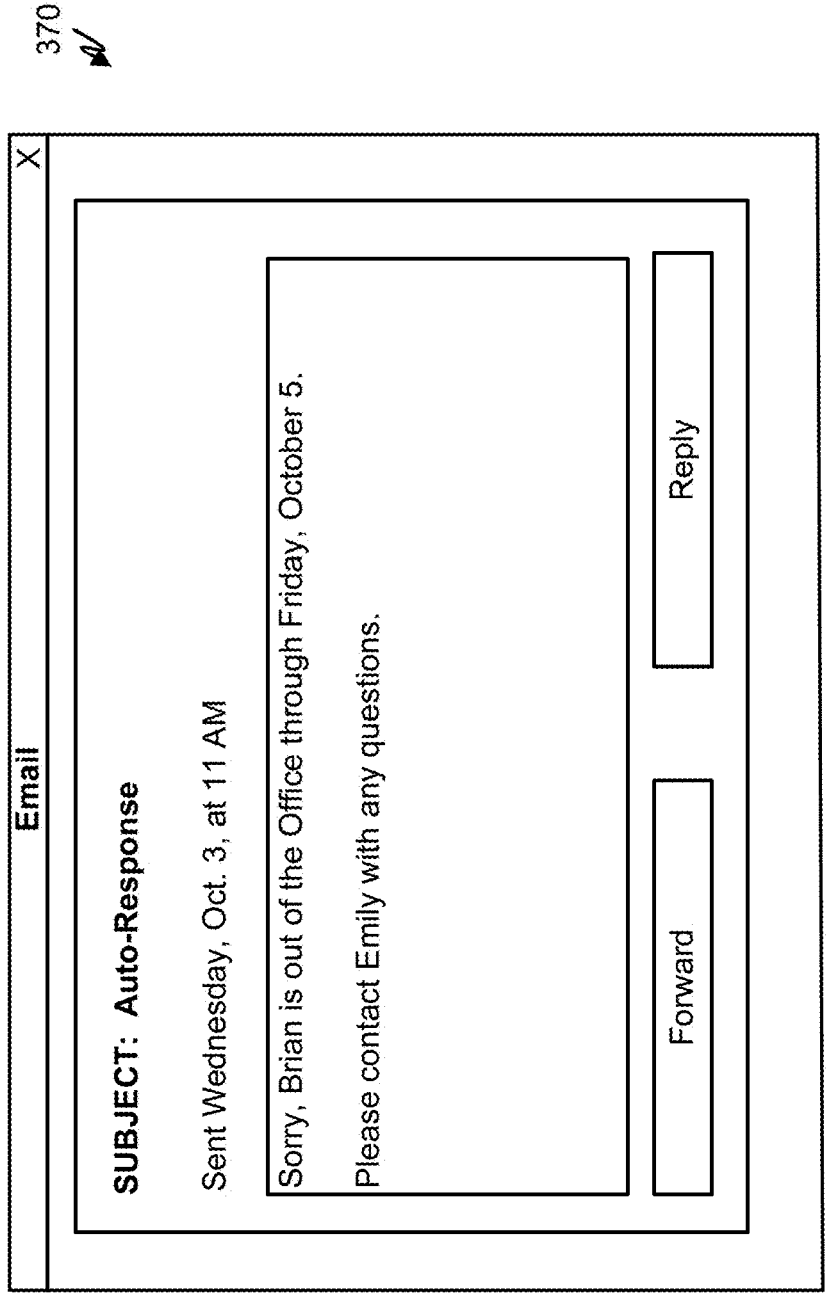

As illustrated in FIG. 3E, an out-of-office status in a calendaring application may comprise an auto-response email 370 which may be sent automatically in response to incoming emails. The auto-response email 370 may comprise a subject and body which may have been customized by the responsible user as described herein.

After an out-of-office status has been set for a user, the user's calendar user interface may be updated to show the scheduled out-of-office time period as illustrated by the user interface 380 of FIG. 3F. AAs illustrated in the drawings, the calendar user interface 300 of FIG. 3A has been updated to the user interface 380 of FIG. 3F in which an "OUT OF OFFICE" banner is displayed on the days in which the out-of-office time period is scheduled.

Figure 3G:
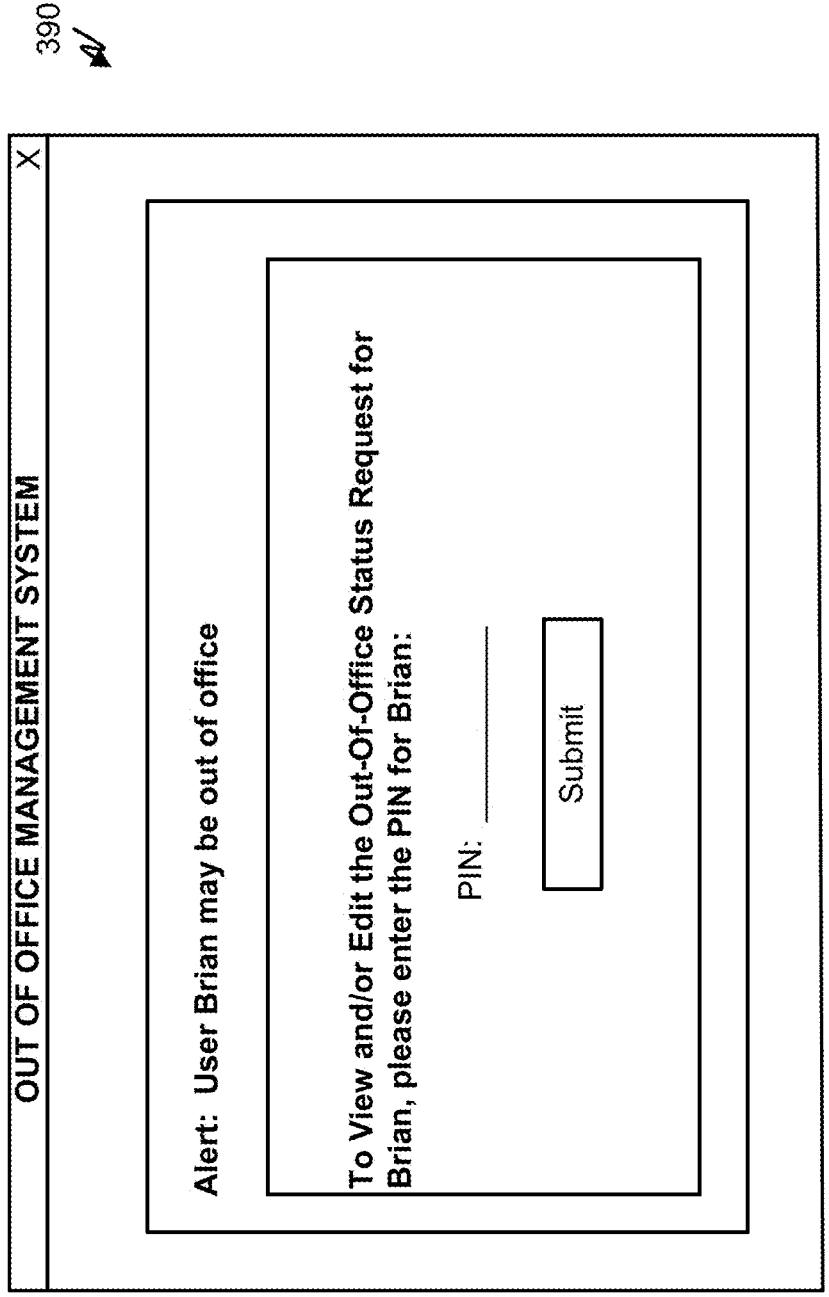
Figure 3H:
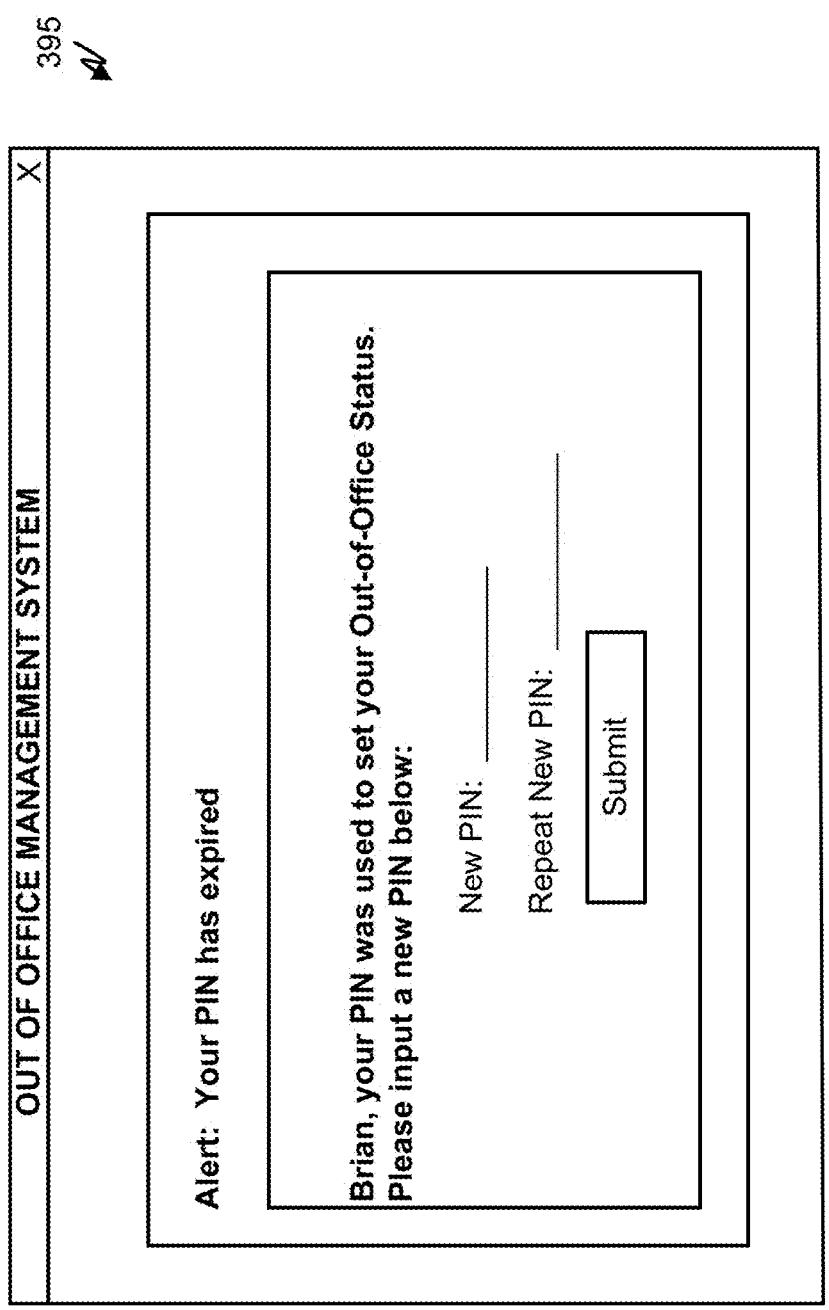

In some embodiments, the request may comprise a prompt for entry of a password or PIN. For example, as illustrated in FIG. 3G, prior to generating the out-of-office message or request for approval, the computer system may first prompt the responsible user to enter a password or PIN in a user interface 390. The computer system may then compare the password or PIN received from the responsible user to a stored password for the out-of-office user. In some embodiments, the password or PIN for the out-of-office user may be set by the out-of-office user. For example, when logging in to an email application, a user may be asked to set a security password in case he or she wants to have a third party to enable his or her out-of-office status in case of an emergency. The password or PIN may be reset every time it is used. For example, when a first user informs a second user that the first user will be leaving or otherwise needs his or her out-of-office status to be set, the first user may either at that time or at an earlier time share a password or PIN with the second user. The second user may then be enabled, through an email application, to enable the out-of-office status for the first user. In other embodiments, the second user or another responsible user may be presented with a request for approval generated by the email application which may contain a field for entering the password or PIN. The out-of-office status for the first user may then be activated after verifying the security code, PIN, or password. Once the first user is back and opens his or her email application, the application may prompt the first user to enter a new security password in a user interface 395 as illustrated in FIG. 3H as the one set has already been used preventing anyone to set the out-of-office status anytime without user consent.

Figure 4:
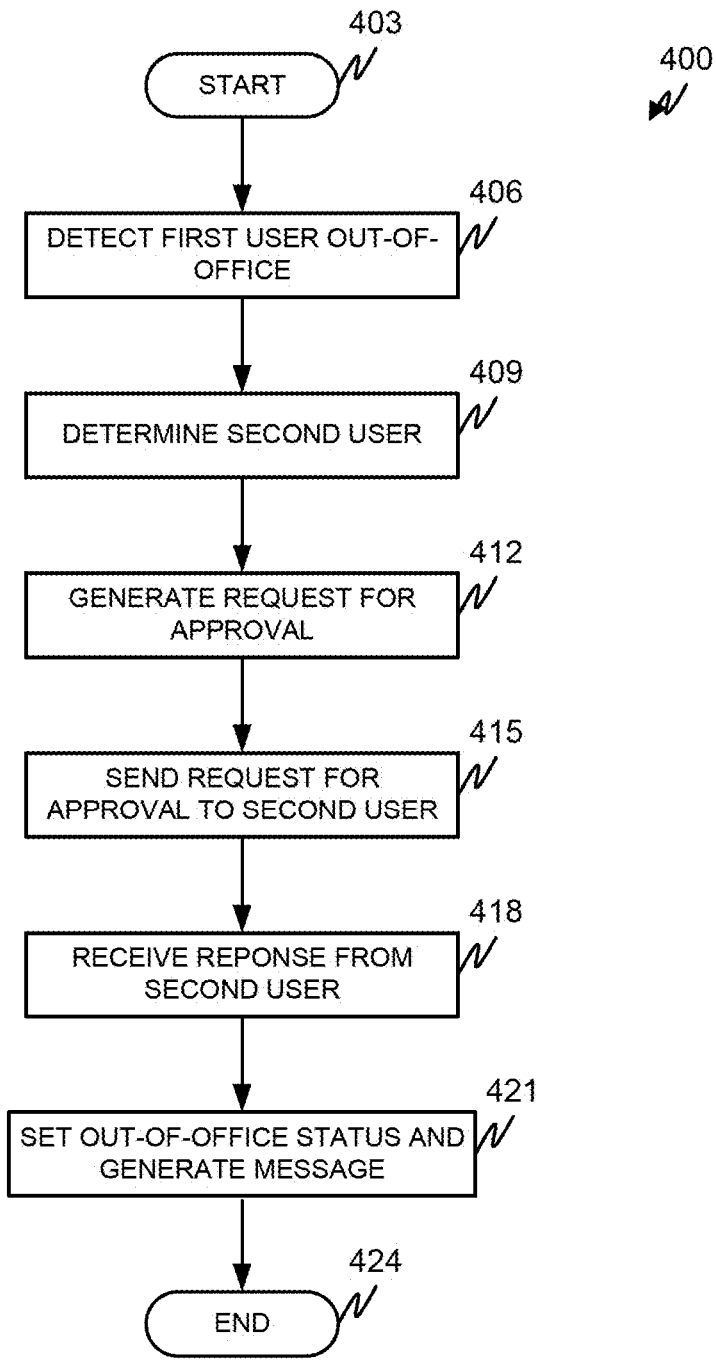
FIG. 4 is a flowchart of a method in accordance with one or more embodiments of the present disclosure.

FIG. 4 is a flowchart of a method 400 in accordance with one or more embodiments of the present disclosure. The method 400 may begin at step 403 in which a user of a computer system executing an electronic mailing application may interact with the computer system to create an email using the calendaring mailing. As discussed above, while the method 400 is described in relation to scheduling an out-of-office status based on text of an email, it should be appreciated the same or a similar method may be used to automatically schedule an out-of-office status based on text of other forms of communications, such as text messages, or text-based messages within applications other than an email application. Furthermore, instead of text, the method 400 may comprise analyzing audio of a recording or a live audio stream, such as a voice of a user during a phone call. Finally, the out-of-office status may, alternatively or in addition to being a status set within a calendar application and resulting in auto response emails, be a setting for a voicemail or any other type of electronic status. For example, the method 400 may result in the creation of a voicemail message to be played in response to an incoming call.

At 406, the computer system may detect the user is or will be out-of-office. In some embodiments, detecting the user is out-of-office comprises analyzing text of an email sent by the user at 403. For example, analyzing text of the email sent by the user may comprise inputting the text of the email into a trained artificial intelligence (AI) system.

A trained AI system may comprise, for example, a neural network configured to analyze text or audio and determine whether the text or audio indicates a user will be out-of-office. For example, an input of a text string comprising "I will be away from the office" may result in a determination that the writer of the text string is or will be out of the office. Similarly, an audio recording of a user saying "I am going on vacation" may also result in a determination that the writer of the text string is or will be out of the office. AI can be used to detect words such as "sick," "emergency leave," "not available," "vacation," etc., to trigger the approval email.

In some embodiments, the computer system analyzing the email or audio from the user may output a percentage or score indicating a likelihood of the user having sent the email or created the audio being out-of-office. For example, a neural network or other AI system may be trained to estimate the likelihood of the user being out-of-office.

In some embodiments, the method 403 may further comprise determining, based on the text of the email, a duration of an out-of-office status for the first user. Determining a duration of an out-of-office status may comprise determining a start time and date and an end time and date for the out-of-office status. A trained AI system, such as that of the AI system for determining whether the text or audio indicates the user will be out-of-office, may be used to determine a duration of the out-of-office status. A duration of an out-of-office status may begin at a present time or a past moment. For example, if a user states in an email that he or she is leaving the office now, the duration may begin at the present moment. A duration of an out-of-office status may also be indefinite. If a user does not state whether he or she will be returning, the AI system may determine the end time and date of the duration is unclear.

For example, if an email includes text referring to a number of days or dates for which the writer of the email will be on vacation or otherwise out-of-office, the computer system may determine an out-of-office status should be set for that particular time. It should also be appreciated that in some cases an out-of-office status may be set without duration.

At 409, the computer system may determine a second user associated with the first user. Determining a second user associated with the first user may comprise determining an identity of a supervisor or manager of the first user. For example, a computer system may be enabled to perform a data lookup using an organizational chart. In some embodiments, the second user may be determined based on a setting set by the first user. For example, the first user may be enabled to preselect another user to be the responsible user in the event of the first user being away.

In some embodiments, a chain of command may be implemented. For example, if the first user's first choice for a responsible user is unavailable, such as out-of-office, the computer system may select a second choice from a list of users. It should be appreciated that each user may be capable of setting their own preferences for which other user may have authority to set out-of-office status settings for each user. Such preferences may be set using a user interface of an email application, calendaring application, or other type of application. In some embodiments, authority may be based on a determination as to which user is a manager or supervisor of each user.

In some embodiments, determining the second user associated with the first user may comprise determining the second user is authorized to set out-of-office status for the first user. For example, an organizational chart may include a listing of users who are available to set out-of-office status for other users.

At 412, the computer system may generate a request for approval. In some embodiments, a request for approval may be generated in response to a threshold likeliness of a user being out-of-office. For example, if analysis of an email sent by a user determines a likelihood of the user being out-of-office is greater than seventy percent, a request may be generated.

A request for approval may comprise an identification of the user who is or will be out-of-office. For example, the user who is or will be out-of-office may be identified by a real name or a username. The identification of the user may also include other information such as job title, role, responsibilities, etc.

A request for approval may also comprise an indication as to the text or audio which led to the determination that the user is or will be out-of-office. For example, the request for out-of-office approval may comprise at least a portion of text of the email sent by the first user.

A request for approval may also comprise an indication of an estimated start date and/or time, end date and/or time, or a combination thereof. As described herein, the start and end dates and/or times may be determined automatically based on an email, voice recording, or other type of communication from the out-of-office user.

A request for approval may also comprise an editable field or fields allowing the reviewing user to adjust a text or audio auto response, dates and/or times for the out-of-office to start or end, and/or other options. For example, in some embodiments, the request for out of office approval comprises an editable field including a duration of out-of-office status and an editable field including an automatically generated text for the out-of-office message.

In some embodiments, the request may comprise a prompt for entry of a password. For example, prior to generating the out-of-office message or request for approval, the computer system may first prompt the responsible user to enter a password or PIN. The computer system may then compare the password or PIN received from the responsible user to a stored password for the out-of-office user. In some embodiments, the password or PIN for the out-of-office user may be set by the out-of-office user. For example, when logging in to an email application, a user may be asked to set a security password in case he or she wants to have a third party to enable his or her out-of-office status in case of an emergency. The password may be reset every time it is used. For example, when a first user informs a second user that the first user will be leaving or otherwise needs his or her out-of-office status to be set, the first user may either at that time or at an earlier time share a password or PIN with the second user. The second user may then be enabled, through an email application, to enable the out-of-office status for the first user. In other embodiments, the second user or another responsible user may be presented with a request for approval generated by the email application which may contain a field for entering the password or PIN. The out-of-office status for the first user may then be activated after verifying the security code, PIN, or password. Once the first user is back and opens his or her email application, the application may prompt the first user to enter a new security password as the one set has already been used preventing anyone to set the out-of-office status anytime without user consent.

In some embodiments, the computer system may first determine whether the user who is or will be out-of-office already has his or her out-of-office status set. If the user who is or will be out-of-office already has his or her out-of-office status set, the computer system may not generate a request for approval.

For example, a request may state, "we see that Mike is on leave and does not have an out-of-office status set. If you wish to enable his OOO click the link to approve." If the responsible user approves the out-of-office status, the computer system may set the out-of-office status for Mike automatically.

At 415, the computer system may send the request for approval to the responsible user. The request may be sent in the form of a pop-up notification, an email, text message, or other form of communication. The request may include a user interface displaying information relating to the request as well as enabling the responsible user to adjust settings. By interacting with the request, the responsible user may be enabled to respond by approving—either before or after editing the out-of-office status to be set—or denying the request.

At 418 the computer system may wait for and receive a response from the responsible user. The response may be received in the form of interactions with the request, an email, a text message, or other form of communication.

In some embodiments, the computer system may wait for only a particular amount of time, such as one hour, before proceeding to select another user as the responsible user. Such an embodiment may be useful in the event that the initially selected responsible user is unavailable.

At 421, the computer system may generate an out-of-office message and set an out-of-office status for the first user. The out-of-office status may, when set for the user, result in a voicemail message being played when the user receives a call, and/or an auto-response email being sent when the user receives an email. The auto-response email or the voicemail message may comprise the same or a portion of the text as sent by the out-of-office user in the email or call analyzed by the computer system to determine the user is or will be out-of-office. Alternatively, the auto-response email or voicemail message may comprise text or audio created by the responsible user.

In some embodiments, a voicemail message may be generated automatically using, for example, a text-to-speech application. The out-of-office status may be set for the first user for the determined duration of the out-of-office status. For example, if the duration starts at a later date and/or time, the out-of-office status may not begin until the start date and/or time occurs. Similarly, if the duration has an end date and/or time, the out-of-office status may cease at that date or time.

In some embodiments, when an out-of-office status is set for a user, a message may be generated automatically and sent to the user including a prompt for the user to end out-of-office status for the user. In this way, if the out-of-office status is set in error, the user may quickly terminate the status. Similarly, a prompt or notification may be displayed in a user interface associated with the user enabling the user to disable the out-of-office status.

At 424, the method 400 may end. While the method 400 is described herein as being performed by a computer system executing a calendar application, it should be appreciated that any computer system capable of receiving information from a user device may be used. For example, methods and systems described herein may be performed by a server in communication with a computer system executing a calendar application.

Embodiments of the present disclosure include a computer-implemented method of automatically generating an out-of-office message for a user, the method comprising: detecting a first user is out-of-office; determining a second user associated with the first user; generating a request for out-of-office approval; sending the request for out-of-office approval to the second user; receiving an approval from the second user; and generating an out-of-office message for the first user.

Embodiments of the present disclosure also include a user device comprising: a processor; and a computer-readable storage medium storing computer-readable instructions which, when executed by the processor, cause the processor to execute a method, the method comprising: detecting a first user is out-of-office; determining a second user associated with the first user; generating a request for out-of-office approval; sending the request for out-of-office approval to the second user; receiving an approval from the second user; and generating an out-of-office message for the first user.

Embodiments of the present disclosure also include a computer program product comprising: a non-transitory computer-readable storage medium having computer-readable program code embodied therewith, the computer-readable program code configured, when executed by a processor, to execute a method, the method comprising: detecting a first user is out-of-office; determining a second user associated with the first user; generating a request for out-of-office approval; sending the request for out-of-office approval to the second user; receiving an approval from the second user; and generating an out-of-office message for the first user.

Aspects of the above methods include wherein detecting the first user is out-of-office comprises analyzing text of an email sent by the first user.

Aspects of the above methods include wherein analyzing text of the email sent by the first user comprises inputting the text of the email into a trained artificial intelligence system.

Aspects of the above methods include wherein the out-of-office message comprises at least a portion of the text of the email sent by the first user.

Aspects of the above methods include wherein the request for out-of-office approval comprises the text of the email sent by the first user.

Aspects of the above methods include determining, based on the text of the email, a duration of an out-of-office status for the first user.

Aspects of the above methods include setting the out-of-office status for the first user for the determined duration of the out-of-office status.

Aspects of the above methods include, prior to determining the second user: determining a third user associated with the first user; and determining the third user is unavailable, wherein the second user is determined in response to determining the third user is unavailable.

Aspects of the above methods include wherein determining the second user associated with the first user comprises determining the second user is one or more of a manager and a supervisor of the first user.

Aspects of the above methods include wherein determining the second user associated with the first user comprises determining the second user is authorized to set out-of-office status for the first user.

Aspects of the above methods include wherein the request comprises a prompt for entry of a password, and wherein the methods further comprise, prior to generating the out-of-office message, comparing a received password to a stored password.

Aspects of the above methods include: generating a request for a change of password; and presenting the request for the change of password to the first user.

Aspects of the above methods include wherein the request for out of office approval comprises a prompt for entry of text, and the out-of-office message comprises text received from the second user.

Aspects of the above methods include wherein the request for out of office approval comprises an editable field including a duration of out-of-office status and an editable field including an automatically generated text for the out-of-office message.

Aspects of the above methods include transmitting a message to the first user including a prompt for ending an out-of-office status for the first user.

Aspects of the above methods include displaying a prompt in a user interface associated with the first user enabling the first user to disable an out-of-office status comprising the out of office message.

Aspects of the above methods include wherein the out-of-office message is one or more of a text message and an audio message.

Aspects of the above methods include wherein the out-of-office message is a voicemail message.

Examples of the processors as described herein may include, but are not limited to, at least one of Qualcomm® Snapdragon® 800, 810, 820, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, Rockchip RK3399 processor, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infrared data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A computer-implemented method of automatically generating text for an out-of-office message for a first user, the method comprising:
   processing, using a first artificial intelligence system, with one or more processors, text sent by the first user to another user;
   determining, with the one or more processors and based on the processing of the text by the first artificial intelligence system, that the first user is out-of-office;
   in response to determining that the first user is out-of-office:
      identifying, with the one or more processors, a second user that is authorized to set the out-of-office message for the first user;
      generating, with the one or more processors, a request for out-of-office approval; and
      sending, with the one or more processors, the request for out-of-office approval to the second user;
   receiving, with the one or more processors, an approval from the second user; and
   in response to receiving the approval from the second user:
      automatically generating, with a second artificial intelligence system, the text for
      the out-of-office message for the first user; and
      using the generated text for the out-of-office message to set the out-of-office message on an email application associated with the first user.

2. The method of claim 1, wherein the text comprises text of an email sent by the first user to the another user.

3. The method of claim 1, wherein the another user is the second user.

4. The method of claim 2, wherein the out-of-office message comprises at least a portion of the email.

5. The method of claim 1, wherein the request for out-of-office approval comprises the text sent to the another user.

6. The method of claim 1, further comprising determining, based on the text sent to the another user, a duration of an out-of-office status for the first user.

7. The method of claim 6, wherein the out-of-office message is set for the determined duration.

8. The method of claim 1, further comprising, prior to identifying the second user:
   identifying a third user associated with the first user; and
   determining the third user is unavailable,
   wherein the second user is identified in response to determining the third user is unavailable.

9. The method of claim 1, wherein identifying the second user associated with the first user comprises determining the second user is one or more of a manager and a supervisor of the first user.

10. The method of claim 1, wherein the second user is authorized to edit the out-of-office message for the first user.

11. The method of claim 1, wherein the request for out-of-office approval comprises a prompt for entry of a password, and further comprising, prior to generating the text for the out-of-office message, comparing a received password to a stored password.

12. The method of claim 11, further comprising:
generating a request for a change of password; and
presenting the request for the change of password to the first user.

13. The method of claim 1, wherein the request for out-of-office approval comprises a prompt for entry of text, and wherein the out-of-office message comprises text received from the second user.

14. The method of claim 1, wherein the request for out-of-office approval comprises an editable field including a duration of out-of-office status and an editable field including an automatically generated suggestion of text for the out-of-office message.

15. The method of claim 1, further comprising transmitting a message to the first user including a prompt for ending an out-of-office status for the first user.

16. The method of claim 1, further comprising displaying a prompt in a user interface associated with the first user enabling the first user to disable an out-of-office status comprising the out-of-office message.

17. The method of claim 1, further comprising generating an audio message.

18. The method of claim 17, further comprising using the generated audio message to set a voicemail message for the first user.

19. A user device comprising:
a processor; and
a computer-readable storage medium storing computer-readable instructions which, when executed by the processor, cause the processor to execute a method, the method comprising:
processing, using a first artificial intelligence system, text sent by a first user to another user;
determining, based on the text processed by the first artificial intelligence system, that the first user is out-of-office;
in response to determining that the first user is out-of-office:
identifying a second user that is authorized to set an out-of-office message for the first user;
generating a request for out-of-office approval; and
sending the request for out-of-office approval to the second user;
receiving an approval from the second user; and
in response to receiving the approval from the second user:
automatically generating, with a second artificial intelligence system, text for an out-of-office message for the first user; and
using the generated text for the out-of-office message to set the out-of-office message on an email application associated with the first user.

20. A computer program product comprising:
a non-transitory computer-readable storage medium having computer-readable program code embodied therewith, the computer-readable program code configured, when executed by a processor, to execute a method, the method comprising:
processing, using a first artificial intelligence system, text sent by a first user to another user;
determining, based on the processing of the text by the first artificial intelligence system, that the first user is out-of-office;
in response to determining that the first user is out-of-office:
identifying a second user that is authorized set an out-of-office message for the first user;
generating a request for out-of-office approval; and
generating a request for out-of-office approval; and
sending the request for out-of-office approval to the second user;
receiving an approval from the second user; and
in response to receiving the approval from the second user:
automatically generating, with a second artificial intelligence system, text for an out-of-office message for the first user; and
using the generated text for the out-of-office message to set the out-of-office message on an email application associated with the first user.

* * * * *

UNITED STATES PATENT AND TRADEMARK OFFICE
CERTIFICATE OF CORRECTION

PATENT NO. : 12,141,724 B2
APPLICATION NO. : 17/470845
DATED : November 12, 2024
INVENTOR(S) : Tanvi Sharma, Pragati Dhumal and Navanath Navaskar It is certified that error appears in the above-identified patent and that said Letters Patent is hereby corrected as shown below:

In the Claims

In Column 18, Line 33, Claim 20 please delete the text of "generating a request for out-of-office approval; and".

Signed and Sealed this
Eighteenth Day of March, 2025

Coke Morgan Stewart
*Acting Director of the United States Patent and Trademark Office*